(12) United States Patent
Nelges

(10) Patent No.: US 8,933,773 B2
(45) Date of Patent: Jan. 13, 2015

(54) LAMINATED LAYER STRUCTURE FOR PRODUCING AN INSULATION MATERIAL

(71) Applicant: ABB Technology AG, Zurich (CH)

(72) Inventor: Jörg Nelges, Mosbach (DE)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 13/849,741

(22) Filed: Mar. 25, 2013

(65) Prior Publication Data
US 2013/0214892 A1   Aug. 22, 2013

Related U.S. Application Data

(63) Continuation of application No. PCT/EP2011/003755, filed on Jul. 27, 2011.

(30) Foreign Application Priority Data

Sep. 23, 2010   (EP) .................................... 10178748

(51) Int. Cl.
*H01F 27/24* (2006.01)
*H01F 5/00* (2006.01)
(Continued)

(52) U.S. Cl.
CPC  *H01F 3/02* (2013.01); *B32B 27/36* (2013.01); *H01B 3/40* (2013.01); *H01B 3/47* (2013.01); *B32B 17/04* (2013.01); *B32B 27/08* (2013.01); *B32B 27/12* (2013.01); *B32B 27/38* (2013.01); *B32B 27/42* (2013.01); *B32B 1/08* (2013.01); *B32B 2262/101* (2013.01); *B32B 2307/206* (2013.01); *B32B 2307/3065* (2013.01); *B32B 2307/50* (2013.01); *B32B 2597/00* (2013.01)

USPC ........... 336/212; 336/200; 336/234; 428/209; 174/135; 174/167

(58) Field of Classification Search
USPC .................. 336/212, 200, 234; 428/209, 901; 174/138, 135, 167
See application file for complete search history.

(56) References Cited

U.S. PATENT DOCUMENTS 3,843,481 A    10/1974  Hoheisel
4,289,172 A *   9/1981  Ekstrom ....................... 138/149
(Continued)

FOREIGN PATENT DOCUMENTS

DE              2 323 923 A1    4/1974
DE            196 35 362 C1    12/1997
WO      WO 2009/109216 A1    9/2009

OTHER PUBLICATIONS

International Search Report (PCT/ISA/210) issued on Nov. 3, 2011, by the European Patent Office as the International Searching Authority for International Application No. PCT/EP2011/003755.

*Primary Examiner* — Alexander Talpalatski
*Assistant Examiner* — Kazi Hossain
(74) *Attorney, Agent, or Firm* — Buchanan Ingersoll & Rooney PC

(57)   ABSTRACT

A layer structure for producing a planar insulation laminate, including the following sequence of planar individual layers arranged one on the other: a B-stage resin, a glass fabric, a core layer made of polyester film, a glass fabric, and a B-stage resin. In the hardened state, an insulation material produced therefrom is suitable, for example, to be used as an insulation barrier between a low-voltage winding and a high-voltage winding of a transformer winding.

19 Claims, 1 Drawing Sheet

(51) Int. Cl.
*B32B 3/00* (2006.01)
*H01B 7/00* (2006.01)
*H01B 17/58* (2006.01)
*H01F 3/02* (2006.01)
*B32B 27/36* (2006.01)
*H01B 3/40* (2006.01)
*H01B 3/47* (2006.01)
*B32B 17/04* (2006.01)
*B32B 27/08* (2006.01)
*B32B 27/12* (2006.01)
*B32B 27/38* (2006.01)
*B32B 27/42* (2006.01)
*B32B 1/08* (2006.01)

(56) References Cited

U.S. PATENT DOCUMENTS

| | | | |
|---|---|---|---|
| 4,675,235 A * | 6/1987 | Wu | 428/363 |
| 5,785,789 A * | 7/1998 | Gagnon et al. | 156/235 |
| 6,284,082 B1 * | 9/2001 | Schuler et al. | 156/190 |
| 7,405,361 B1 * | 7/2008 | Lester et al. | 174/138 E |
| 2007/0169886 A1 * | 7/2007 | Watanabe et al. | 156/325 |
| 2011/0220401 A1 * | 9/2011 | Ying et al. | 174/260 |

* cited by examiner

LAMINATED LAYER STRUCTURE FOR PRODUCING AN INSULATION MATERIAL

RELATED APPLICATION(S)

This application claims priority as a continuation application under 35 U.S.C. §120 to PCT/EP2011/003755, which was filed as an International Application on Jul. 27, 2011 designating the U.S., and which claims priority to European Application No. 10178748.9 filed in Europe on Sep. 23, 2010. The entire contents of these applications are hereby incorporated by reference in their entireties.

FIELD

The disclosure relates to a laminated layer structure for the production of a sheet-like insulation material, and also to an insulation material produced therefrom.

BACKGROUND INFORMATION

The design of high-voltage-system components, such as dry transformers, uses insulation means. For example, when there is little separation between two components operated at different voltage levels (for example, between an upper- and lower-voltage winding of a transformer), electrical breakdown can result. In order to prevent this, insulation barriers can be used which increase the flashover length and thus provide increased reliability of operation of the component. In the case of nested lower- and upper-voltage windings in a high-voltage dry transformer (for example, for a voltage level between 6 kV and 30 kV), this type of barrier is designed as a thin-walled insulating hollow cylinder arranged within the radial region that separates the lower-voltage winding, which can be located radially inwards, from the upper-voltage winding, which can be located radially outwards.

The cylinder can be composed, for example, of a thin-walled multilayer laminate. Laminate is the term used for a material or a product which is composed of two or more layers where large surfaces have been bonded to one another by adhesion or by other means. These layers can be composed of identical or different materials. A laminate suitable for the abovementioned insulation purpose can have, for example, the following layer structure, where the polyester foil can determine electrical strength:

8 µm of hardened polyester imide resin or epoxy resin;
50 µm of polyester non-woven;
350 µm of polyester foil;
50 µm of polyester non-woven;
350 µm of polyester foil;
50 µm of polyester non-woven;
8 µm of hardened polyester imide resin or epoxy resin.

It is also possible to use a polyester foil adhesive-bonded from multiple plies (for example, up to 4 plies), the layer thickness in each case being 350 µm.

This type of laminate, resembling a strip, is produced in roll form by means of appropriate lamination equipment. In order to convert this to the desired hollow cylinder shape of an insulation barrier for a high-voltage transformer, a strip section of desired length and width is manually bent into a hollow cylinder shape and fixed at an overlap by a heat-resistant adhesive tape. It can be desirable that the entire structure has a heat resistance in temperature class F, i.e., 155° C., for application in dry transformers in the high-voltage sector.

A disadvantage here is that the first-mentioned laminate structure with its overall thickness of about 1 mm can have restricted stability which is not suitable for the production of hollow insulation cylinders for relatively large transformers, for example, for a rated power of 5 MW and above. Addition of further layers with a resultant higher overall thickness involves increased cost and use of material, and can be disadvantageous. Another disadvantage is that this type of insulation barrier can contribute to a fire load of a transformer.

Although the four-ply polyester foil described as an alternative has slightly higher mechanical stability, because of a lack of a coating on the external sides of the foil composite it may only be suitable for temperature class B, i.e., 130° C.

SUMMARY

According to an exemplary aspect, a laminated layer structure for the production of an insulation material is provided, comprising, in the following sequence: a first B-stage resin layer; a first glass fabric layer; a core layer made of polyester foil; a second glass fabric layer; and a second B-stage resin layer.

According to an exemplary aspect, an insulation material is provided that is produced by heating an exemplary laminated layer structure to a baking temperature, wherein the heating is effective to completely polymerize the B-stage resin of the first and second B-stage resin layers.

According to an exemplary aspect, a high-voltage winding is provided, comprising: a lower-voltage winding that is arranged in the form of a hollow cylinder around a winding axis, an upper-voltage winding arranged in the form of a hollow cylinder around the same winding axis, wherein the upper-voltage winding is radially separated from the lower-voltage winding, and an exemplary laminated layer structure, wherein the laminated layer structure is present in a cavity formed by the radial separation between the lower-voltage winding and the upper-voltage winding.

DETAILED DESCRIPTION

Figure 1:
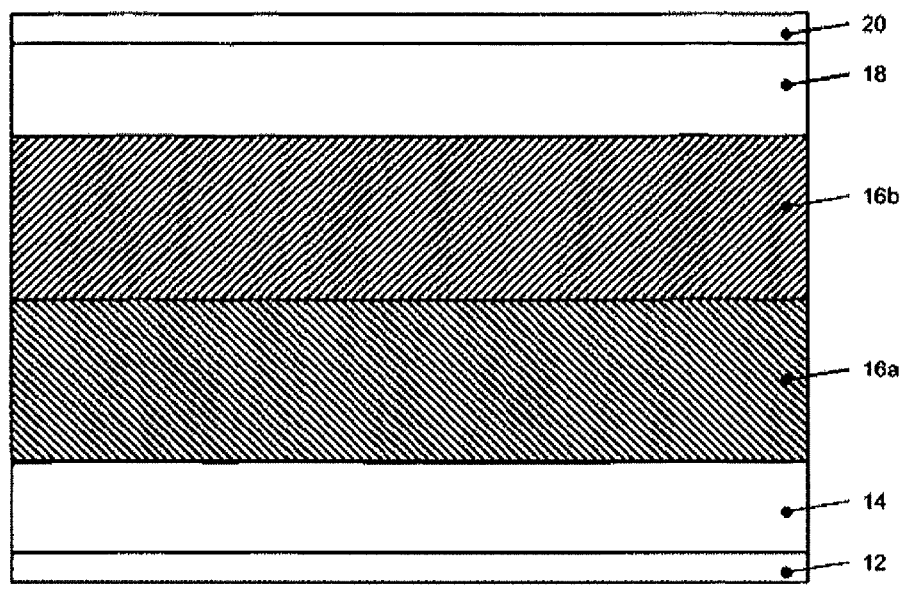
FIG. 1 shows an example of a first laminated layer structure, according to an exemplary aspect.

According to an exemplary aspect, disclosed is an insulation material and a suitable precursor therefore which features increased stability or reduced content of combustible materials.

According to an exemplary aspect, disclosed is a laminated layer structure for the production of a sheet-like insulation material. The structure can be characterized by the following sequence of sheet-like individual layers arranged on top of one another:

B-stage resin;
glass fabric;
core layer made of polyester foil;
glass fabric;
B-stage resin.

According to an exemplary aspect, an underlying concept is to use, instead of an alternating sequence of polyester foil and polyester non-woven, a core layer made of polyester foil surrounded on both sides by a layer of glass fabric with an adjacent layer of B-stage resin.

The expression "B-stage" applied to a resin means, for example, that the process of hardening of the resin has begun but then has been intentionally interrupted in such a way that the resin is in a state of incomplete polymerization. The expression B-stage applied to a resin can also mean that this has been converted to a solid state by appropriate heating to a temperature of, for example, 80° C., that brings about melting and then cooling, without initiating the actual chemical reaction of polymerization. The resin in this type of state can be remelted at an appropriate temperature, while the actual polymerization takes place at a temperature above the temperature that brings about melting.

For example, during lamination, the resin can be applied in the form of a liquid A-stage resin, for example, by means of a roll with appropriate surface structure. In a drying process that follows, for example, it can then be passed through an oven where the temperature is such that although the resin is then converted to a B-stage resin, polymerization is substantially avoided.

The lamination of a multilayer structure can comprise laminating a plurality of plies in a single lamination process. The lamination of a multilayer structure can also comprise merely laminating two layers to give an intermediate product which is wound up onto a roll. For example, the intermediate product can then be subsequently laminated together with further layers.

In an exemplary embodiment, a finished laminated layer structure does not yet have the desired final stability. For example, the laminated layer structure may still have to be heated to a baking temperature so that the B-stage resin becomes liquid and bonds to the glass fabric layer. For example, by virtue of capillary action, the B-stage resin can be, at least to some extent, absorbed into the interstices of the glass fabric layer. The baking temperature can be sufficiently high to initiate the polymerization process. After the cooling process that follows, the polymerization of the resin can be complete and can form an insulation material with appropriately high stability. The arrangement of the resulting glass fabric composite layers at the two external sides of the sheet-like insulation material can ensure that the overall structure has high stability, even at a low overall thickness. The content of combustible material in the laminate layer can be advantageously reduced because, in contrast to a polyester nonwoven that in an exemplary embodiment is omitted, the glass fabric does not contribute to fire load.

In an exemplary embodiment of the laminated layer structure, the ratio of the thickness of a resin layer to the thickness of a glass fabric layer adjacent thereto is about 3:20. The amount of the liquid resin can be adjusted so as to be appropriate to the volume of the space to be filled within the glass fabric.

In an exemplary embodiment, the thickness of each of the resin layers is about 15 µm and the thickness of each of the glass fabric layers is about 100 µm. The thickness achieved for the two outer layers, taking account of the abovementioned ratio, can be adjusted to be appropriate for an overall thickness of about 1 mm for the sheet-like insulation material. The exemplary thickness of the resin layers, for example, 15 µm, can be a lower limit for giving adequate stability together with the respective glass fabric layer. Higher layer thicknesses, for example, 50 µm, can also be possible and useful. In this case, for example, the resin layer is not absorbed completely into the glass fabric and the surface is correspondingly smoother. For example, the thickness of each resin layer can be from about 15 to 50 µm.

In an exemplary embodiment, a further increase in the thickness of the glass fabric layer can be useful in the event of an increased overall thickness, but even in this case does not contribute to fire load. In an exemplary embodiment, if desired, an increased overall thickness can be employed, a further reduction in the thickness of the polyester foil can be made for reducing fire load, and compensation can be achieved by correspondingly increasing the thickness of the glass fabric layers. For example, an increased overall thickness can be employed in view of the lower insulation capability of the glass fabric in comparison with the polyester foil.

In an exemplary embodiment, the core layer can have two plies of a polyester foil of a thickness of about 350 µm. A thickness of 350 µm can be a readily available thickness, while foils with increased thickness of, for example, 500 µm can be more difficult to produce. In an exemplary embodiment, the insulation core can be manufactured from two plies of a foil of a thickness of 350 µm. The resultant overall thickness, together with the layer thicknesses of the two external plies, can approach 1 mm. For higher overall thicknesses, the respective layer thicknesses can be scaled up appropriately and/or can be replicated by using an appropriately increased number of individual layers. If appropriate lamination equipment is available, this type of laminate structure can then be initially produced in the form of a layer structure of polyester foil, glass fabric and B-stage resin, where the polyester-foil sides of two plies of this intermediate product can then be adhesive-bonded or laminated to one another.

For example, phenol-epoxy precondensate or bisphenol A resin can be used as the B-stage resin. These can provide good results when used for coating, and they can also have suitable temperature-related properties. Examples can include Hexion Epenol 9968-LG as an exemplary phenol-epoxy precondensate and Albesiano 8045/A as an exemplary bisphenol A resin. In an exemplary embodiment, the baked and hardened state provides heat resistance corresponding to temperature class F, i.e., above 155° C. For manufacturing-related reasons, it can be desirable that the baking temperature is not excessively above the heat-resistance temperature, for example, within the range from 120° C. to 180° C., for example, about 140° C.

In an exemplary embodiment, the laminated layer structure has a hollow cylindrical shape which has been adjusted to be appropriate to the internal space formed between lower- and upper-voltage windings in a transformer that is to be manufactured. A hollow cylindrical shape of this type can be provided by cutting a section of appropriate width and length of a laminate (for example, from a roll on which it is delivered). Clamps can be used to fix it in the appropriate shape. For example, to provide insulation of an appropriate overlap, a few centimeters can be provided here where the two ends are bonded. In this way, the hollow cylinder can easily be integrated as an insulation barrier into an appropriate transformer winding during the manufacture thereof. The diameter of the cylinder can be, for example, from 0.5 m to 2 m. The diameter can depend on the rated power of the transformer and on the structure of the winding.

In an exemplary embodiment, before the laminated layer structure is used as insulation material, the structure can be heated to at least the baking temperature for a period in order to produce the final insulation material with the desired strength via formation of the outer glass fabric composite layers or complete polymerization of the resin.

An exemplary temperature range for the period of heating can be from 120° C. to 180° C. for a period of at least 30 min.

According to an exemplary aspect, provided is a high-voltage winding including: a lower-voltage winding, arranged in the form of a hollow cylinder around a winding axis; an upper-voltage winding, arranged in the form of a hollow cylinder around the same winding axis; wherein there is a radial separation between the lower-voltage winding and the upper-voltage winding. The high-voltage winding can include an exemplary laminated layer structure of an appropriately adapted shape arranged within a cavity formed in the radial separation.

The laminated layer structure can be an insulation barrier between the lower- and upper-voltage winding. Because a winding of this type can be predominantly of a radially symmetrical structure, the shape of the intervening space between the two windings can be similar to a cylinder. A hollow cylindrical shape of the laminated layer structure can be a suitable shape for permitting easy integration into the entire winding. For example, it is also conceivable to assemble a hollow cylindrical shape of this type from a plurality of shell-like segments.

For example, the final electrical functionality of a winding of this type (for example, in the form of a winding prior to assembly or as a part of a completely assembled transformer) can be attained when it has been heated for a period of time, to at least a baking temperature such that a completely polymerized glass fabric composite material has been formed at the external sides of the hollow cylinder. This type of heating for a period of time can be an existing process step during the production process of a transformer. An example is when a B-stage resin, for example, a prepreg, is used for insulating the conductors in the lower-voltage winding. For example, there is no need for any additional heating procedure for the hollow cylinder used as insulation barrier. For example, the use of a heat-resistant adhesive tape to fix the hollow cylinder can also be omitted because after the heating process, the resin, which initially is again liquid, can produce a bond for bonding the laminate, rolled into the shape of a cylinder. This can result in high strength after hardening.

FIG. 1 shows an exemplary embodiment, not necessarily to scale, of a first laminated layer structure 10 including individual layers, wherein the reference numerals represent the following:

12: 15 μm of a B-stage resin, for example Hexion Epenol 9968-LG
14: 100 μm of glass fabric
16a: 350 μm of polyester foil, forming a first sublayer of the core layer
16b: 350 μm of polyester foil, forming a second sublayer of the core layer
18: 100 μm of glass fabric
20: 15 μm of a B-stage resin, for example Hexion Epenol 9968-LG.

After a respective heating procedure, the resin layers 12, 20 can be absorbed at least to some extent into the cavities of the adjacent glass fabric layers 14, 18 and, with such material, form a solid composite material resulting from the complete polymerization of the resin.

Figure 2:
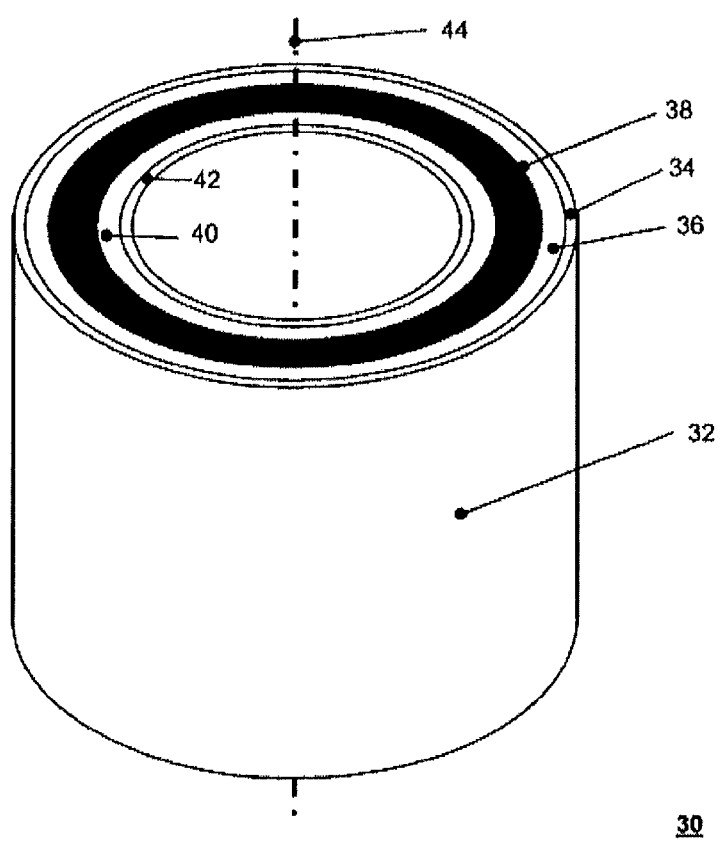
FIG. 2 shows an example of a second laminated layer structure, according to an exemplary aspect.

FIG. 2 shows an exemplary embodiment of a second laminated layer structure 30, which has a hollow cylindrical shape 32 arranged around a winding axis 44. This depiction, which is not necessarily to scale, shows a structure of the individual layers, wherein the reference numerals represent the following:

34: 15 μm of a B-stage resin, for example Albesiano 8045/A
36: 100 μm of glass fabric
38: 700 μm of core layer made of polyester foil
40: 100 μm of glass fabric
42: 15 μm of a B-stage resin, for example Albesiano 8045/A.

The layer thicknesses mentioned are exemplary guideline values which are themselves subject to, for example, manufacturing tolerances.

Reference numerals set forth in the drawings refer to the following:

10 first example of a laminated layer structure
12 first individual layer of B-stage resin
14 first individual layer of glass fabric
16a first polyester foil layer of core layer
16b second polyester foil layer of core layer
18 second individual layer of glass fabric
20 second individual layer of B-stage resin
30 second example of a laminated layer structure
32 hollow cylindrical shape
34 first individual layer of B-stage resin
36 first individual layer of glass fabric
38 core layer
40 second individual layer of glass fabric
42 second individual layer of B-stage resin
44 winding axis It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A laminated layer structure for the production of an insulation material, comprising, arranged in the following sequence:
a first B-stage resin layer;
a first glass fabric layer;
a core layer made of polyester foil;
a second glass fabric layer; and
a second B-stage resin layer,
wherein the first B-stage resin layer is in direct contact with the first glass fabric layer, and
wherein the second B-stage resin layer is in direct contact with the second glass fabric layer.

2. The laminated layer structure as claimed in claim 1, wherein the ratio of the thickness of at least one of the first and second B-stage resin layers to the thickness of at least one of the first and second glass fabric layers adjacent thereto is about 3:20.

3. The laminated layer structure as claimed in claim 2, wherein the thickness of each of the first and second B-stage resin layers is about 15 μm and the thickness of each of the first and second glass fabric layers is about 100 μm.

4. The laminated layer structure as claimed in claim 1, wherein the core layer includes two plies of a polyester foil.

5. The laminated layer structure as claimed in claim 1, wherein each of the first and second B-stage resin layers contains a phenol-epoxy precondensate or a bisphenol A resin.

6. The laminated layer structure as claimed in claim 1, wherein the structure has a hollow cylindrical shape.

7. An insulation material produced by heating the laminated layer structure as claimed in claim 1 to a baking temperature, wherein the heating is effective to completely polymerize the B-stage resin of the first and second B-stage resin layers.

8. The insulation material as claimed in claim 7, wherein the heating to the baking temperature takes place within a temperature range from 140° C. to 180° C. for a period of at least 30 minutes.

9. A high-voltage winding, comprising:
a lower-voltage winding that is arranged in the form of a hollow cylinder around a winding axis, an upper-voltage winding arranged in the form of a hollow cylinder around the same winding axis, wherein the upper-voltage winding is radially separated from the lower-voltage winding, and the laminated layer structure as claimed in claim 1, wherein the laminated layer structure is present in a cavity formed by the radial separation between the lower-voltage winding and the upper-voltage winding.

10. The high-voltage winding as claimed in claim 9, wherein an insulation material is produced from the laminated layer structure by heating the entire winding to a baking temperature.

11. The laminated layer structure as claimed in claim 1, wherein the first B-stage resin layer is in direct contact with the first glass fabric layer, and wherein the second glass fabric layer is in direct contact with the second B-stage resin layer.

12. The laminated layer structure as claimed in claim 11, wherein upon heating the first and second B-stage resin layers, the first B-stage resin layer is at least partially absorbed into interstices of the first glass fabric layer, and the second B-stage resin layer is at least partially absorbed into interstices of the second glass fabric layer.

13. The laminated layer structure as claimed in claim 1, wherein:

the first B-stage resin layer is in directed contact with the first glass fabric layer, the first glass fabric layer is in direct contact with the core layer made of polyester foil, the core layer made of polyester foil is in direct contact with the second glass fabric layer, and the second glass fabric layer is in direct contact with the second B-stage resin layer.

14. The laminated layer structure as claimed in claim 13, wherein upon heating the first and second B-stage resin layers, the first B-stage resin layer is at least partially absorbed into interstices of the first glass fabric layer, and the second B-stage resin layer is at least partially absorbed into interstices of the second glass fabric layer.

15. The laminated layer structure as claimed in claim 1, wherein the laminate layer structure does not include a polyester non-woven.

16. The laminated layer structure as claimed in claim 4, wherein each ply of the core layer has a thickness of about 350 µm.

17. The laminated layer structure as claimed in claim 6, wherein all of the layers of the laminated layer structure are concentrically arranged, wherein the first B-stage resin layer is the innermost concentric layer and the second B-stage resin layer is the outermost concentric layer.

18. The laminated layer structure as claimed in claim 1, wherein the first glass fabric layer is in direct contact with the core layer, and wherein the second glass fabric layer is in direct contact with the core layer.

19. The laminated layer structure as claimed in claim 18, wherein the core layer consists of the polyester foil.

* * * * *